United States Patent [19]

Hatheway

[11] Patent Number: 5,187,876
[45] Date of Patent: Feb. 23, 1993

[54] PRECISION MOTION TRANSDUCER

[76] Inventor: Alson E. Hatheway, 595 E. Colorado Blvd., Suite 400, Pasadena, Calif. 91101

[21] Appl. No.: 807,789

[22] Filed: Dec. 12, 1991

Related U.S. Application Data

[63] Continuation of Ser. No. 700,080, May 3, 1991, abandoned, which is a continuation of Ser. No. 389,709, Aug. 4, 1989, abandoned.

[51] Int. Cl.$^5$ ............................................. B23Q 16/00
[52] U.S. Cl. .......................................... 33/568; 33/613
[58] Field of Search ................ 33/573, 568, 828, 613, 33/544.5

[56] References Cited

U.S. PATENT DOCUMENTS

| | | | |
|---|---|---|---|
| 2,661,540 | 12/1953 | Dulligan | 33/544.5 |
| 2,817,232 | 12/1957 | Flinn | 73/854 |
| 2,859,613 | 11/1958 | Green | 73/849 |
| 3,086,406 | 4/1963 | Voser | 74/318 |
| 3,174,333 | 3/1965 | Behre | 73/794 |
| 3,178,936 | 4/1965 | Finsterwalder | 73/854 |
| 3,281,944 | 11/1966 | Youngblood | 33/561 |
| 3,596,863 | 8/1971 | Kasparek | 248/278 |
| 3,610,131 | 10/1971 | Clark et al. | 73/795 |
| 4,367,658 | 1/1983 | Rochelt | 74/40 |
| 4,426,055 | 1/1984 | Reedy et al. | 33/286 |
| 4,495,704 | 1/1985 | Hammer et al. | 33/568 |
| 4,537,080 | 8/1985 | Christiansen | 73/857 |
| 4,553,332 | 11/1985 | Golinelli et al. | 33/561 |
| 4,559,717 | 12/1985 | Scire et al. | 33/568 |
| 4,565,094 | 1/1986 | Sedgewick | 33/568 |
| 4,603,588 | 8/1986 | Niermann et al. | 73/794 |
| 4,630,473 | 12/1986 | Park et al. | 73/849 |
| 4,667,415 | 5/1987 | Barsky | 33/568 |
| 4,773,748 | 9/1988 | Shih et al. | 350/611 |
| 4,818,830 | 4/1989 | Bron | 74/110 |
| 4,887,804 | 12/1989 | Ohtsuka | 33/568 |
| 4,991,309 | 2/1991 | Nagasawa et al. | 33/568 |

FOREIGN PATENT DOCUMENTS

| | | | |
|---|---|---|---|
| 0083410 | 7/1983 | European Pat. Off. | 33/1 M |
| 0150161 | 11/1979 | Japan | 33/559 |
| 0013301 | 1/1982 | Japan | 33/568 |

Primary Examiner—William A. Cuchlinski, Jr.
Assistant Examiner—Alvin Wirthlin
Attorney, Agent, or Firm—Robbins, Dalgarn, Berliner & Carson

[57] ABSTRACT

A precise motion transducer is described. The transducer converts relatively large inputs, either forces or motions, into relatively small predictable and repeatable motions at the output. The input forces or motions may be produced by a Micrometer, a set of calibrated masses (weights), an electromagnetic voice coil (solenoid) or any other standard or customized device that can produce a calibrated force or motion and deliver this force or motion to the transducer. The force or motion, once delivered to the transducer body, is then transformed into a small motion which is then available to control the position or motion of a component, device or instrument. The transducer, thus constructed comprises a deformable elastic transducer body, a mechanism for applying known calibrated loads or displacements to the deformable elastic transducer body, a means for attaching the transducer to the fixed chassis, frame or foundation of the instrument, a mechanism for selecting, isolating and transmitting the desired motion of the elastic transducer body to the item to be moved or positioned, and a means for attaching the elastic transducer body to the item to be moved or positioned. When the input force or motion is produced by a Micrometer, a track pad and anvil are placed between the Micrometer spindle and the surface of the transducer to provide a uniform distribution of the contact stresses and to prevent wear of the transducer at the contact surface.

11 Claims, 5 Drawing Sheets

PRECISION MOTION TRANSDUCER

This is a continuation of application Ser. No. 07/700,080, filed May 3, 1991, now abandoned, which is a continuation of Ser. No. 07/389,709, filed on Aug. 4, 1989, entitled "PRECISION MOTION TRANSDUCER", now abandoned.

BACKGROUND OF THE INVENTION

This invention relates to the generation and control of small motions and displacements, both translational and rotational.

In precision instruments, especially optical instruments, it is often desirable to be able to adjust the position of the various elements of the instrument to be able to achieve the best possible performance, such as tuning a laser cavity to peak the power. Similarly, it is often desirable to accurately position a specimen for observation by a microscope, X-ray source or other instrument. This involves making very small adjustments in the instrument. In precision instruments, these motions may range from a fraction of a millimeter to a micrometer. In optical instruments, one is interested in making adjustments that are a small fraction of the wavelength of the light for which the optical system is designed, requiring motions with magnitudes from a micrometer to an angstrom.

These motions and adjustments are currently being made with Micrometers, compound screws and piezoelectric crystals. Micrometers are limited to the larger motions in the range of interest because the technology of making precision screw threads limits the thread pitch to about 1.60 threads to the millimeter. One turn of such a Micrometer produces about 625 micrometers of motion. If one can reliably produce a half-degree angular motion of the thimble of the Micrometer, then one may reliably produce a 0.87 micrometer motion. Use of optical encoders to read the angular position may improve accuracy some but the increased precision is soon overwhelmed by the backlash and other imperfections in the mated threads and supporting structure of the Micrometer. A precision Micrometer is limited to resolutions and motions larger than about 0.50 micrometer.

To achieve smaller resolutions, the Micrometer is often combined with some form of lever which further provides some reduction in the resulting motion from the Micrometer. Levers are limited in their ability to provide high reduction ratios in a small space. A lever that produces a 10,000:1 reduction requires its arm length to be in that same ratio. Features smaller than about 0.5 millimeter are difficult to manufacturer for the same reason as threads being limited to 1.6 per millimeter. If 0.5 millimeter is the smallest arm length, then a 10,000:1 reducer requires a long arm of 5 meters in length.

Compound screws offer much higher average mechanical advantages than single screws (e.g., Micrometers), but imperfections in the manufacture of the screw threads lead to cyclic run-out errors. The cyclic run-out errors in compound screw threads generate an oscillating axial component of motion superimposed upon the desired linear translation of the spindle. The oscillating axial motions make compound screw threads incapable of materially improving on the accuracy of the basic precision Micrometer.

Piezoelectric devices have been employed to generate small motions. These devices are quartz crystals which are exposed to an electrostatic fields across them. If the axes of the crystal lattice are appropriately oriented with respect to the electric field, then a small (but perceptible) change occurs in the dimensions of the crystal lattice. This results in a dimensional change for the whole quartz crystal. These devices can produce motions down to very small quantities (an angstrom or less) but suffer sizeable hysteresis effects (five to ten percent of full scale) which prevent the device from returning to the same point every time the voltage is adjusted to the apparently appropriate value. To overcome the hysteresis effects, piezoelectric devices are often fitted with optical encoders to measure their motion (position). The voltage is then adjusted to obtain the desired reading from the optical encoder. In these applications, the lower limit of accuracy (about 0.01 micrometer) is controlled by the accuracy with which optical encoders may be produced. The stability of these devices is further limited by thermal expansion of the material on which the optical encoder bars are deposited, usually quartz also.

The prior art which utilizes pivots is incapable of controlling translational or rotational motions of the small magnitude required for precision optical instruments. The current state of the art generally utilizes relatively large rigid levers and relatively small pivots or flat blade flexures, sometimes referred to as "film hinges." Such systems usually make no attempt to control the undesired translational or rotational components of motion. Said pivot systems usually have reduction ratios too large for use with precision instruments. Moreover, existing motion transducers utilizing pivot systems are susceptible to errors due to thermal expansion, hysteresis, and thermo-elastic effects which prevent accurate and repeatable motions.

Therefore, it is desirable in many applications to provide a motion transducer which produces accurate and repeatable small motions which are not susceptible to errors introduced by imperfect machining, thermal expansion, hysteresis or thermo-elastic effects.

SUMMARY OF THE INVENTION

A motion transducer having an elastic body adapted to receive means for applying an input force or motion to the elastic body. Application of the input force or motion creates translational and rotational displacement components within the elastic body. The input forces are counter balanced to prevent the force components within the elastic body from entering the foundation to which the elastic body is fixed. The translational and rotational displacement components may be converted into a single translational or rotational component used to displace an external element at a pre-determined location on the elastic body.

Other embodiments include a track pad machined from a cylindrical body. One side of the body is machined to create a conical recess to receive the force applying means. The other side of the cylindrical body is machined flat and perpendicular to the axis of the conical recess.

In a first aspect, the present invention provides a motion transducer with an elastic body, foundation means for supporting the elastic body, means supported by the elastic body for producing an input force or displacement, means on the elastic body for receiving the input force or displacement to create strain within the elastic body and for counterbalancing the strain to prevent force and displacement components from the strain from entering the foundation means from the body, and means for directing and controlling the strain in the elastic body into at least one single, repeatable output deflection of the elastic body with respect to the foundation means.

In a further aspect, the present invention provides a motion transducer with an elastic body, means supported by the elastic body for producing a force or displacement to create strain within the elastic body, means for fixing the elastic body to a foundation, means for counterbalancing the input force or displacement to prevent force or displacement components from entering the foundation, and means for directing and controlling the strain into at least one single, repeatable output deflection component of the elastic body with respect to the foundation.

In a further aspect, the present invention provides a motion transducer with an elastic body, means supported by the elastic body for applying an input force or displacement to the elastic body to create strain therein, means for fixing the elastic body to a foundation, means for receiving and counterbalancing the input force or displacement to prevent force and displacement components from entering the foundation and means for directing and controlling the strain into at least one single, repeatable output deflection of said elastic body resulting from the input force or displacement.

In a further aspect the invention provides a motion transducer, adapted to receive input forces or displacements, having an entirely elastic body including means for insuring that anticipated input forces or displacements will generate strain in the elastic body without perceptible plastic strain within the elastic body, the elastic body having two cutouts, the cutouts forming three flexures for directing and controlling input translational and rotational deflection components within the elastic body into at least one single, repeatable output deflection component, a thick elastic beam and a thin elastic beam parallel to each other and fixed to the elastic body, a bore formed in the beam substantially perpendicular to the thick beam, the bore being adapted to receive a Micrometer inserted into the bore, the beams and bore having means for counterbalancing which are connected to the elastic body to counterbalance the input force or displacement to prevent external force and displacement components from entering the elastic body, means for fixing the Micrometer in the bore, an anvil positioned on the thin beam adapted to be contacted by the Micrometer spindle, means for mounting the elastic body to a foundation, and means for transmitting the output displacements.

In a still further aspect, the present invention provides a motion transducer having an elastic body, means supported by the elastic body for producing strain within the elastic body, means for supporting the elastic body, counterbalancing means adapted to prevent the strain in the elastic body from causing reaction loads in the supporting means and means for providing an output displacement of a portion of the elastic body with respect to the means for supporting the elastic body.

BRIEF DESCRIPTION OF THE DRAWINGS

The above and other features of the present invention may be more fully understood from the following detailed description, together with accompanying drawings, wherein similar reference characters refer to similar elements throughout and in which.

DESCRIPTION OF THE PREFERRED EMBODIMENT

This invention takes advantage of the elastic properties of an extended body to generate small motions. When an elastic body is loaded with forces or deformed by displacements, the body will experience shape changes throughout its volume. An elastic body with a specific applied load or displacement will have a repeatable specific deformed shape. This repeatability makes it possible to define a set of deformations for the body associated with applied loads or deflections.

Furthermore, even though the applied loads or displacements may be very large, the deformations in other parts of the body, away from the points where loads or displacements are applied, may be very small. Such reductions allow one to design an elastic body that has the desired ratio between the applied loads or displacements at one point and the deformations at another point on the body. The performance of such an elastic body will have two performance parameters called Effectiveness Ratios: one Effectiveness Ratio for applied loads, and another for applied displacements. The Effectiveness Ratio for an applied load ($ER_L$) is the response deformation divided by the applied load, $$ER_L = \frac{\text{response deformation}}{\text{applied load}}.$$

Since the response deformation may be either a translational or a rotational quantity and the applied load may be either a force or a moment, the $ER_L$ may have a variety of units.

The Effectiveness Ratio for an applied displacement ($ER_D$) is the response deformation divided by the applied displacement, $$ER_D = \frac{\text{response deformation}}{\text{applied displacement}}.$$

$ER_D$ will also have a variety of units depending upon whether the deformations and displacements are translational or rotational quantities.

In one of the simplest cases, the $ER_D$ will be based upon translations and the resulting quantity may be thought of as a "mechanical advantage" similar to those used to define the effect of a lever system. However, a rigid lever and fulcrum system is reciprocal in that it may be operated from either end; whereas, the elastic body is not necessarily reciprocal, as will be discussed.

Figure 1:
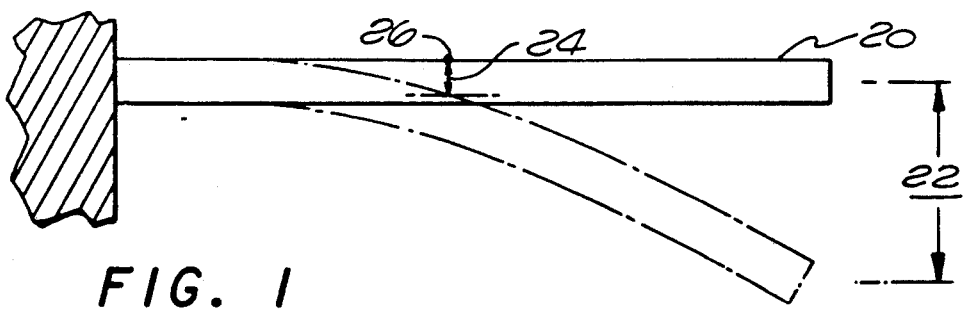
FIG. 1 is an elevational view of a simple cantilever beam fixed at one end.

Referring to FIG. 1, consider a simple elastic cantilever beam 20. An applied displacement 22 at the free end 20 will produce a small elastic deformation 24 at point 26 near the fixed end. The ratio, (24/22) of the two displacements values will be the $ER_D$ for this configuration of elastic body. If, however, one applies the deformation 24 to the beam as a displacement at point 26 and observes the resulting elastic deformation at the free end 20, then one will observe that the deformation value at the free end 20 is not equal to the original displacement 22 applied to the free end 20, as one might expect based upon the reciprocal principles of the rigid lever. Therefore, the $ER_D$s of these two observations are not reciprocals of each other. The reason for this is simple. Elastic bodies do not observe the geometric laws of rigid bodies. The shapes of the elastic curves of the cantilever beams in these two cases are not similar; therefore, the ratios will not be reciprocal.

A similar analysis of the $ER_L$s of elastic cantilever beams will lead to the same conclusion for force or moment loaded elastic bodies. Therefore, unlike rigid bodies, reciprocally loaded elastic bodies do not have similar deflected shapes, and their $ER_D$s and $ER_L$s may not have reciprocal values.

The cantilever beam may be a useful elastic body for transducer applications since it extends the Effectiveness Ratio somewhat beyond that available from a lever system of about the same size. However, the range of the Effectiveness Ratios may be even more greatly extended by the use of extended two and three dimensional bodies. The work performed on the elastic body is distributed throughout the body as strain energy. The strain energy is equal to one half of the product of the stress and strain. In a one dimensional body such as a beam, the strain energy is distributed along its length. In a two or three dimensional area or volume of the body, the strain energy is distributed throughout the body. The reduced strain energy densities result in correspondingly low deflections of the body and extended range of Effectiveness Ratios.

Figure 2:
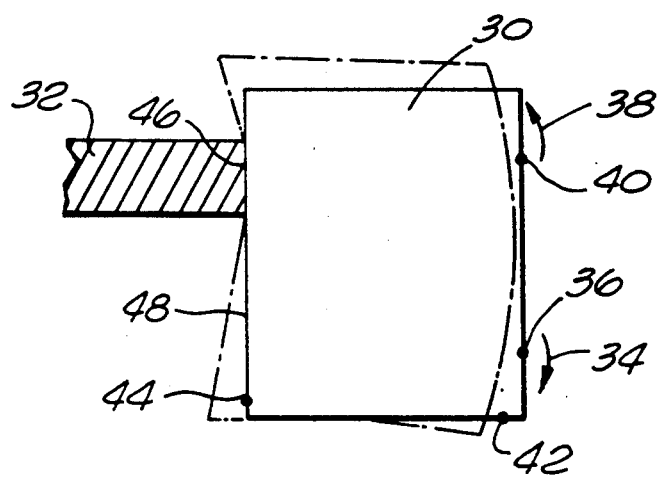
FIG. 2 is an elevational view of a deformable rectangular body.

Referring to FIG. 2, consider the elastic body 30. In addition to the proportions shown, the elastic body 30 also has thickness through the plane of FIG. 2. If one fixes the elastic body 30 to a foundation 32 at mounting surface 46, then the body 30 will be unable to move freely in space. One may now apply a force or moment 34 to the body at point 36, thereby causing the elastic body 30 to deform elastically. In this case, it will be necessary to apply an equal and opposite force or moment 38 to the point 40 in order to prevent reaction loads from entering the foundation 32.

The load applied at 40 will also influence the distribution of the deformations of the elastic body 30. The resulting deformations at points 42 and 44 of the elastic body 30 are shown as dashed lines in FIG. 2. As can be seen, one may select from a variety of response quantities depending upon the location on the surface that one decides to use. Point 44 of the elastic body 30 is in the same plane as mounting surface 46 and is a convenient location to select. Any object brought to rest on the deformation point 44 will experience a motion equal to the elastic deformation caused at point 44 by the loading condition.

The proportions of the elastic body 30 may be adjusted to achieve a great range of Effectiveness Ratios. Referring to FIG. 2, if the horizontal size or depth of body 30 is made smaller, then the deflection at output point 44 will be greater. If the horizontal size or depth of body 30 is made greater, then the deflection will be smaller. Conversely, if the vertical size is made smaller the deflection at the output point 44 will be smaller. And if the vertical size is made greater the output deflection will be greater. Thus, the proportion (horizontal size to vertical size) is a determiner of the Effectiveness Ratio. One way to determine the actual Effectiveness Ratio is by use of the finite element method which can solve for the deflections in one, two and three dimensional bodies.

Each point on the elastic body will experience a maximum of six simultaneous motions; three translational (parallel to the x, y and z axes) and three rotationals (around the x, y and z axes). If one is interested in selecting only one of these components of motion at say point 44, then one can incorporate in the elastic body a system of flexures which are designed to transmit only the desired component of motion to another portion of the body.

FIG. 2 is drawn so the body is shown as rectangular in shape. This is an arbitrary convention and the body may be any shape that is convenient for the designer's application, such as tubular, spherical or the like.

Figure 3:
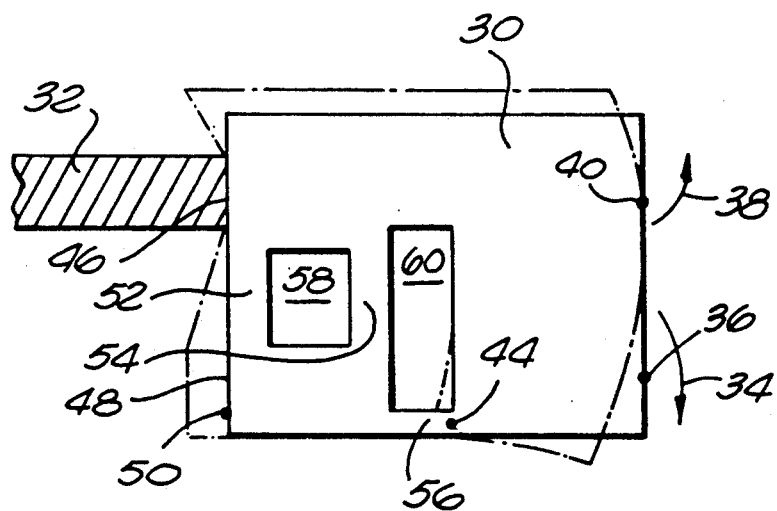
FIG. 3 is an elevational view of one embodiment of the invention.

FIG. 3 shows the elastic body 30 of FIG. 2 enlarged and modified to incorporate flexures 52, 54, 56 formed by (cutouts 58, 60) which select the horizontal translational component of motion at deformation point 44 and transmit only the horizontal translational motion to the output point 50. Note also that the plane of the mounting surface 46 has been moved for the advantage of having co-planar the mounting surface 46 and the moving surface 48 containing output point 50. The elastic body 30 may be constructed to include a plurality of cutouts to create a system of flexures. The size, location, and shape of these cutouts may be calculated using well known beam theory. Such calculations allow the creation of flexures to select the output motion to obtain the desired $ER_D$s and $ER_L$s.

The flexures are double-cantilever beams. Their axial stiffness is proportional to the ratio of the beam depth to the beam length; whereas, the bending stiffness is proportional to the cube of that same ratio. If this ratio is much less than 1.0, then the beam will be much stiffer in its axial direction than in its transverse direction.

In FIG. 3, the pair of parallel vertical flexures 52 and 54 will cause the output point 50 to move only in a horizontal line, because they are stiff along their vertical axes. The single horizontal flexure 56 will push and pull the output point 50 in the horizontal line but will not transmit the angular motion because of its flexibility in bending.

Figure 4:
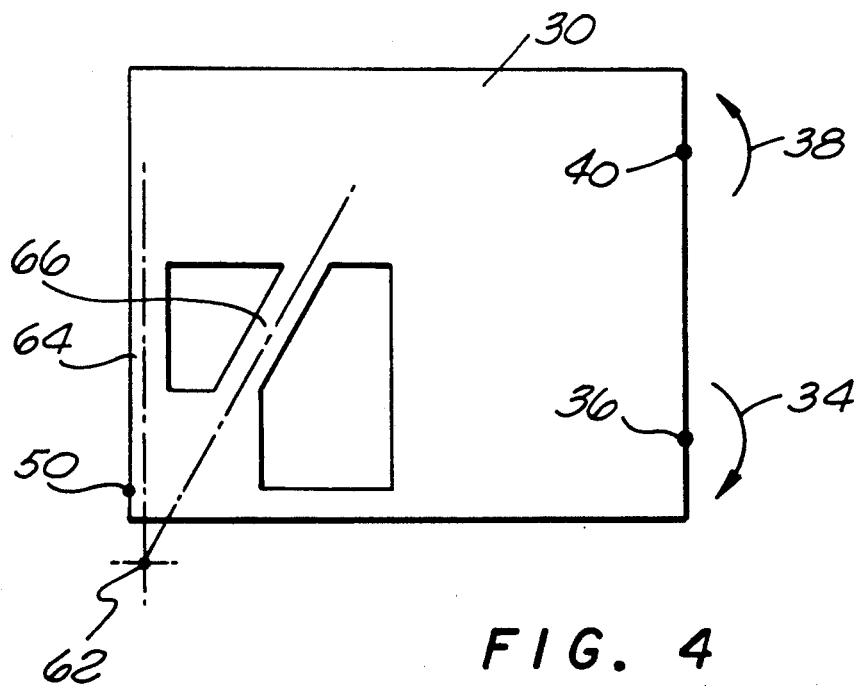
FIG. 4 is an elevational view of a second embodiment of the invention.

Rotational motion may be generated by re-arranging the flexures and recalculating their dimensions and location. One possible arrangement is shown in FIG. 4 in which the output point 50 will rotate about a center of rotation 62. The center of rotation 62 of output point 50 is dictated by the point of intersection of the two centerlines of flexures 64 and 66.

Figure 5:
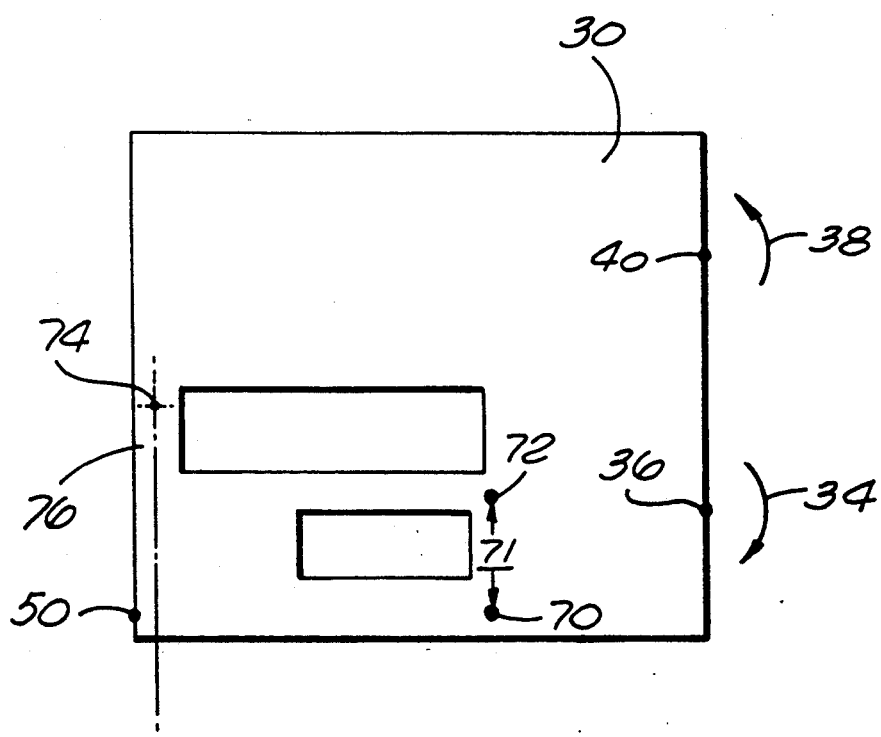
FIG. 5 is an elevational view of a third embodiment of the invention.

Rotational motion may also be transmitted by the arrangement shown in FIG. 5. The points 70 and 72 will have different horizontal displacements. If the horizontal displacements are transmitted to the output point 50, then the output point 50 will rotate through an angle equal to the difference of the displacements at points 70, 72 divided by the vertical distance 71 between points 70, 72. The center of rotation 74 of output point 50 will be in the plane of the vertical centerline of flexure 76. The center of rotation 74 of output point 50 may be accurately determined by the flexure geometry and the motions chosen. Consequently, very small angular motions (rotations) may be generated.

Figure 6:
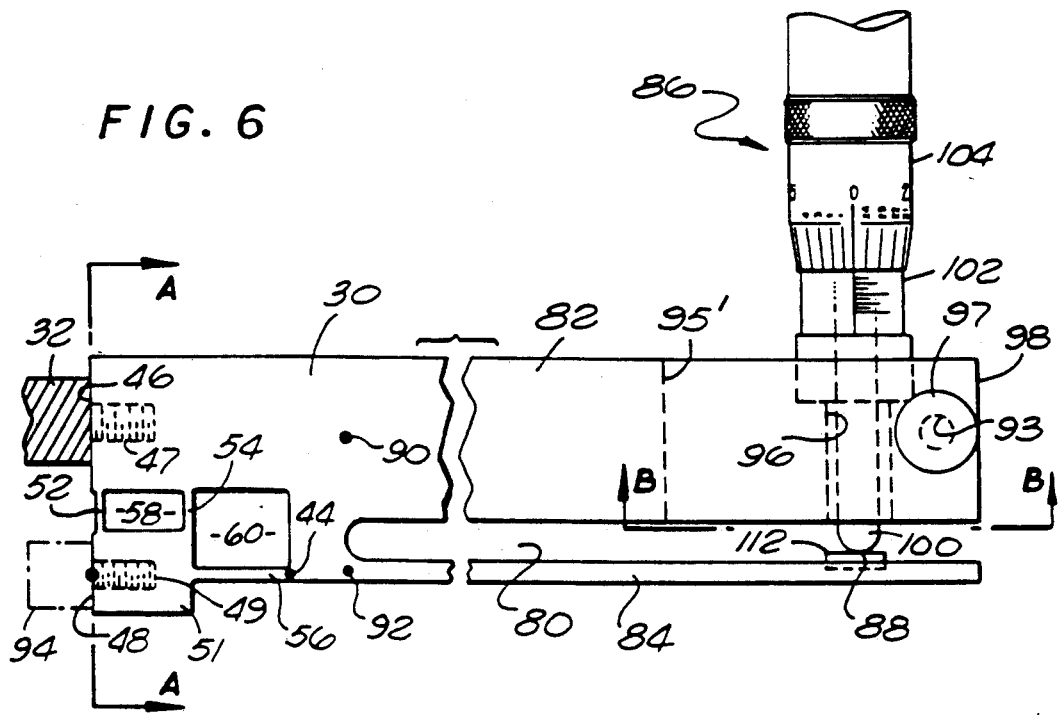
FIG. 6 is an elevational view of the preferred embodiment of the invention.

The elastic body 30 may be further extended to facilitate the loading process. In FIG. 6, the rectangular body has been extended away from moving surface 48 and a slot 80 has been cut into the extension. The slot 80 creates two cantilever beams; a thick beam 82 and a thin beam 84. Near the far edge 98 of the thick beam 82, a mounting bore 95 with clearance 96 has been machined to receive a standard Micrometer 86. The tip of the Micrometer spindle 100 is brought into contact at point 88 against an anvil 112 inserted in thin beam 84. Thus, when the Micrometer spindle 100 is extended, the width of slot 80 is locally increased. This slot width increase is accommodated by elastic deformations of the two cantilever beams 82, 84. The resulting beam deformations are sustained by reaction loads at the fixed end 90 of the thick beam 82 and fixed end 92, of the thin beam 84. The reaction loads result in the balanced loading of the elastic body 30. It can now be seen that by rotating the Micrometer 86, one may achieve a desired loading on the elastic body 30 and, as previously described, a desired small deflection at the moving surface 48.

The deformable elastic body 30 includes a movable output point 50 which is integral with the rest of the deformable elastic body 30, but separated by thin elastic flexures 52, 54, 56. The purpose of said flexures 52, 54, 56 is to transmit to the movable output point 50 only the horizontal translations of the deformation point 44 in the elastic body 30. The two parallel flexures 52, 54 prevent rotation of the movable output point 50 while the single flexure 56 absorbs the rotation of the selected point 44 in the elastic body 30.

The elastic body 30 attaches at the mounting surface 46 which is chosen to be co-planar with the surface 48 of the output point 50 to which the movable device or element 94 is to be attached. This coplanarity minimizes the thermal sensitivity of the whole transducer and simplifies construction.

Figure 6A:
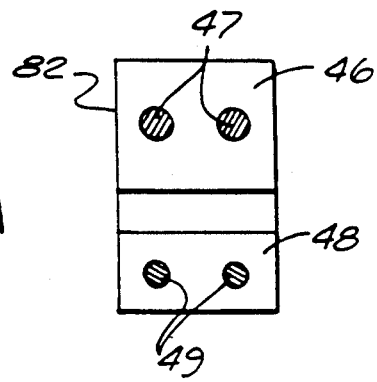
FIG. 6A is a partial cross-sectional elevational view of the preferred embodiment shown in FIG. 6, taken along the line A—A.

Referring to FIG. 6 and 6A, two threaded holes 47 are machined into mounting surface 46 to secure the invention to a foundation 32 by screws passing through foundation 32 and the threading into holes 47. Two threaded holes 49 are machined into moving surface 48 to secure the invention to the movable device or element 94 by screws passing through the movable device 94 and the threading into holes 49. The surface 48 has an extension 51 to provide sufficient body mass to allow machining of threaded holes 49.

The Micrometer 86 is mounted in the thick beam 82 so that the tip of the spindle 100 just touches the surface 88 of the anvil 112 when the spindle 100 is fully retracted to the limit of its calibrated range. The Micrometer mounting method is unimportant as long as the Micrometer barrel 102 is fixed in the bore 95 and the tip adjustment made to avoid over stressing the thin beam 84 at the maximum extension of the Micrometer spindle 100.

Figure 6B:
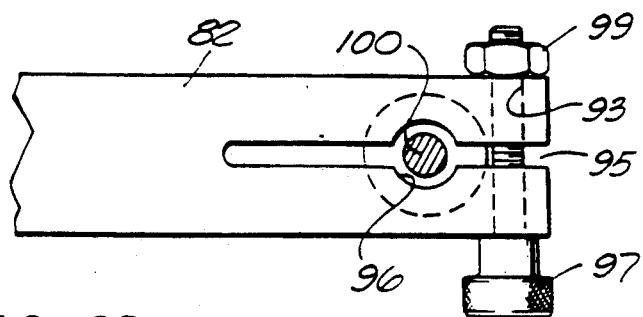
FIG. 6B is a partial cross-sectional plan view of the preferred embodiment of the invention in FIG. 6, taken along the line B—B.

Referring to FIG. 6B, a mounting slot 95' is cut into thick beam 82 to facilitate mounting Micrometer 86. When Micrometer 86 is inserted into a close fitting hole 93, bolt 97 is inserted into a close fitting hole 93 machined in thick beam 82 and the Micrometer 86 is held fixed by securing nut 99 to bolt 97, thus closing slot 95 and clearance 96 around Micrometer 86.

In the precision motion transducer embodied in FIG. 6, the preferred material to be used for the elastic body 30, thick beam 82 and thin beam 84 is aluminum. The Micrometer 86 should be constructed of stainless steel. The cutout 60 to the root of the slot 80 of this embodiment is 0.390 inch. The height of the elastic body 30 is 1.375 inches. The preferred height of thick beam 82 is 1.0 inch, and the height of thin beam 84 is 0.125 inch. Consequently, the height of the slot 80 is 0.250 inch. The length of the slot 80 is 14.0 inches from root of the slot 80 to Micrometer 86 center line. Cutout 58 is 0.030 inch from the indented edge of surface 48 (left edge) and 0.280 inch from the bottom of the elastic body 30. Cutout 58 is 0.565 inch long by 0.250 inch high and cut through the depth of the body 30. Similarly, cutout 60 is 0.625 inch from surface 48, 0.062 inch from the bottom edge of body 30. Cutout 60 is 0.468 inch high, 0.625 inch long and located 0.030 inch from the right edge of cutout 58. Such cutouts give flexure 52 a width of 0.030 inch, and a length of 0.250 inch; flexure 54 a width of 0.030 inch and a length of 0.250 inch; and flexure 56 a width of 0.062 inch and a length of 0.625 inch. The center line of the tapped holes 47 are located 0.420 inch from the top of elastic body 30. If the transducer body is made from 6061-T6 aluminum, then the maximum stresses in the elastic body will be about 10,000 psi for 1.0 inch extensions of the Micrometer spindle 100 and the movable surface 48 will deflect horizontally by about 1.0 micrometer. The $ER_D$ will be equal to about 1:25,000.

Using the materials and dimensions for the preferred embodiment, as previously described, accurate and repeatable movements may be obtained. A displacement of the tip of the Micrometer spindle 100 of 1.0 inches will result in a movement of output point 50 of about $39.4 \times 10^{-6}$ inches. A displacement of 0.01 inches of the spindle 100 will result in a movement of point 50 by about $0.394 \times 10^{-6}$ inches. Similarly, a spindle 100 displacement of 0.0001 inches will result in the movement of point 50 by about $0.00394 \times 10^{-6}$ inches. Thus, repeatable, small output movements may be obtained from relatively large input displacements.

Figure 7:
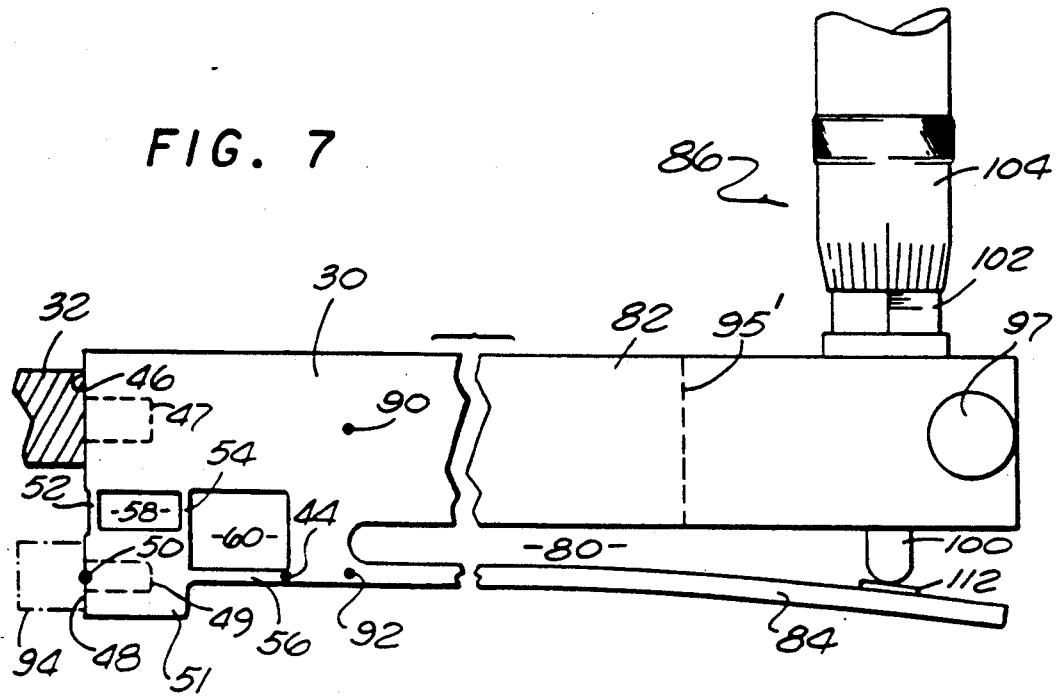
FIG. 7 is an elevational view of the preferred embodiment with the Micrometer spindle fully extended.

The transducer is activated, in this embodiment, by manually turning the Micrometer thimble 104 in order to extend the Micrometer spindle 100. The effect of extending the spindle 100 to the full limit of its calibrated range is shown in FIG. 7. The slot 80 between the cantilever beams 82 and 84 is spread, thereby loading the three dimensional elastic body 30 at the fixed ends of the beams 90 and 92. This loading results in elastic deformations throughout the elastic body 30, including point 44 in FIG. 7. The flexures 52 and 54, 56 cause the output point 50 to make a nearly pure translational motion in the horizontal direction. The ratio of the horizontal motion of the movable output point 50 to the displacement load indicated by the graduations on the Micrometer barrel 102 is the $ER_D(1:25,000)$ for the transducer system.

The Micrometer 86 may be replaced by a voice coil, a solenoid, a pneumatic bellows or any other device that spreads the beams with a calibrated force or displacement. The Micrometer may be replaced with an actuator device of the designers choice. Suitable devices include displacement devices (like a micrometer) and force devices (like a pneumatic bellows or a piston).

In this embodiment the extended elastic body has been made from one monolithic block of material. Although monolithic construction is usually desirable, such construction is not necessary. An elastic body fabricated or assembled from separate parts will also display elastic behavior as long as the joints between the parts are tight and friction free.

If the stresses in the elastic body are below the acceptable yield criterion for the elastic material, then the transducer will exhibit very low, and perhaps no, hysteresis, depending upon the material and the stress levels. Aluminum alloy 6061-T6 exhibits imperceptible plastic strain at stresses below about 10,000 psi. The preferred embodiment will exhibit imperceptible hysteresis.

Hysteresis effects in the elastic body will be due to plastic yielding of the material. The onset of plastic yielding in a material is characterized by the stress level at which a specific amount of plastic strain is observable in test specimens. If the stress levels in the elastic body are maintained below the perceptible yielding points of the material, the transducer will exhibit imperceptible hysteresis effects. Since many engineering materials have sizeable Yield Point stresses (stress where plastic strain=0.002) and micro-yield point stresses (stress where plastic strain=0.000001), many materials may be used for construction of transducers with very small hysteresis effects. Some materials appear to have a sizable region where no plastic strain appears. Such materials may produce transducers with no hysteresis effects at all when the stresses do not exceed the threshold level.

The stiffness of the transducer will be controlled by the stiffness of the mechanism, in this case flexures, used to select, control and deliver the output motion to the movable surface 48 of the elastic body 30. This mechanism is usually the thinnest and softest part of the elastic body 30. Actual stiffness depends upon the details of mechanism design but flexure systems as illustrated here may be designed to be as stiff as the element or device whose motion is being controlled. When no mechanism is used and the device to be controlled is mounted directly to the elastic body 30, the transducer is even stiffer than when flexures are used.

The thermal sensitivity of the transducer system has three sources: thermal expansion of the transducer body, thermo-elastic changes in the transducer body and thermal effects in the loading mechanism. In a displacement loaded transducer, the thermal sensitivity may be reduced nearly to zero if the transducer body and the loading mechanism are made of identical materials and if the mounting surface 46 and the movable surface 48 are co-planar. Since the thermal effects are proportional to displacement between surfaces 46 and 48, a zero effect exists at the zero deflection position. As displacement loads are applied to the transducer body 30, the movable surface 48 is displaced from its original plane by some small amount. This small amount will be subject to the effects of thermal expansion which for most materials is in the fifth or sixth decimal place (0.00001–0.000001) of the amount of deformation of the movable surface 48.

If the loading mechanism is of a different material than the transducer body, then the loading mechanism will contribute some thermal sensitivity to the system due to the difference in the thermal expansion coefficients and the thermo-elastic coefficients in the two materials. These effects, which may be thought of as occurring directly at the loading mechanism, will be proportioned down according to the magnitude of the Effectiveness Ratio. If the Effectiveness Ratio is small (e.g., 0.0001 or 0.000001) then the resulting effect at the movable surface 48 will be similarly small, 0.0001 or 0.000001 of the deformation motion at the movable surface 48.

A similar analysis may be made for the thermal sensitivities in force or moment loaded transducer systems. Therefore, the transducer systems that this disclosure describes may be constructed to have very low sensitivities to both thermal expansion effects and thermo-elastic effects as well as other thermodynamic effects in the loading mechanism.

In the embodiment utilizing a Micrometer (or other rotating threaded device) to impose displacements on the elastic body, one must be concerned with the interface between the tip of the Micrometer 86 and the surface of the thin beam 84. The rotational motion of the Micrometer spindle 100 against the surface of the thin beam 84 creates a friction force in the plane of the surface of the thin beam 84. Since it is not possible to manufacture Micrometers whose tip features have perfect circular symmetry (even spherical ends are imperfectly centered on the diameter of the spindle), the friction force tends to have a large radial component that rotates as the Micrometer spindle 100 is rotated. This radial friction force component may cause a sizeable dry friction effect in the operation of the transducer. This effect shows up as a difference between the loading curve (increasing gap) output deformations and the unloading curve (decreasing gap) output deformations.

Figure 8:
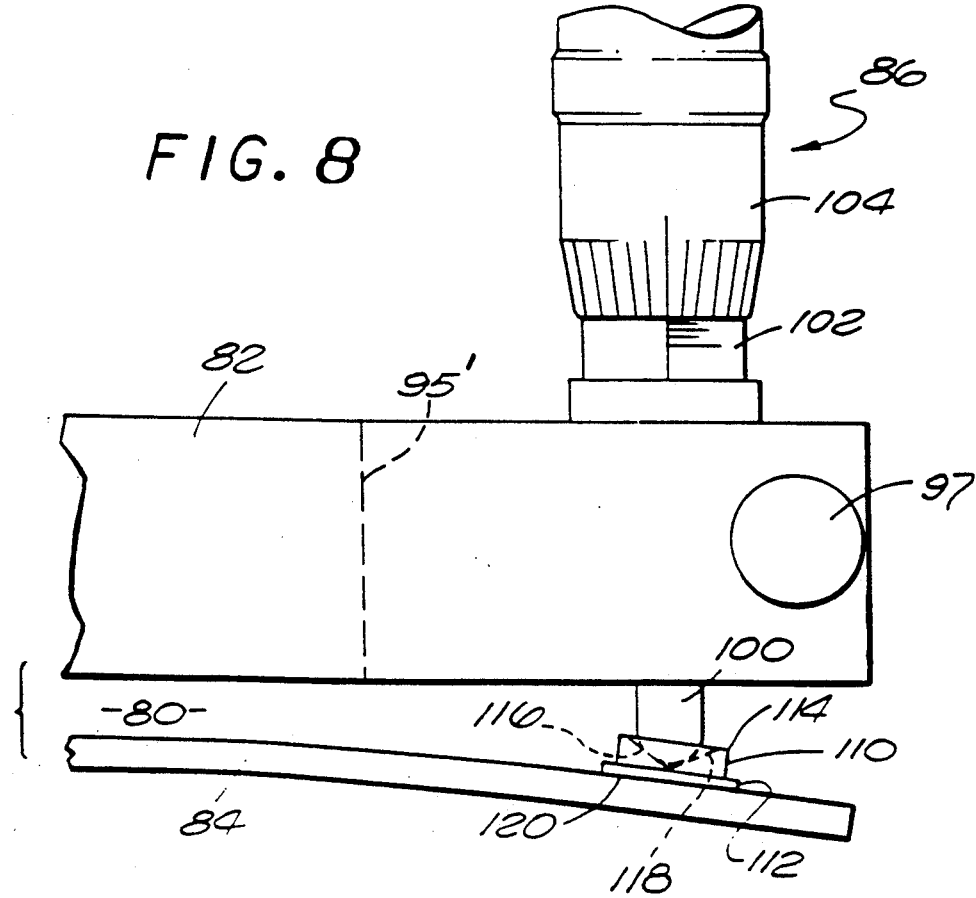
FIG. 8 is a partial elevational view of another embodiment of invention.

The difference between the loading and unloading output deformations may be greatly reduced by the use of a spherical tip on the Micrometer and a "track pad" mounted between the Micrometer tip and the surface of the thin beam. FIG. 8 shows a track pad 110 installed between the spherical tip 116 of a Micrometer spindle 100 and the surface of the thin beam 84. The track pad is made of a compatible bearing material (typically bronze). If the thin beam 84 is made of a soft material like aluminum, a steel anvil plate 112 may need to be installed in the thin beam 84 to bear the loads of the track pad 110. Such an anvil plate 112 is shown in FIGS. 6, 7 and 8.

For the best reduction of unbalanced friction shear stress forces, the track pad 110 and anvil 112 should be constructed to be compatible with the design of the preferred embodiment of FIG. 6. In this embodiment, the body of the track pad 110 is made of bronze, and the anvil 112 of stainless steel, and both are in the form of cylindrical discs. The track pad 110 outside diameter is 0.25 inches (or the same as the spherical tip 116 of the Micrometer spindle 100). The track pad 110 height from surface 120 to surface 114 is 0.125 inches. The diameter of the anvil 112 is 0.350 inches and its thickness is a minimum of 0.080 inches and a maximum of 0.085. The conical recess 118 in the track pad 110 top surface has an angle 124 of 90 degrees. The conical recess 118 has a vertex radius 125 of 0.10 inch maximum to avoid breaking through the flat surface at 120.

Figure 9:
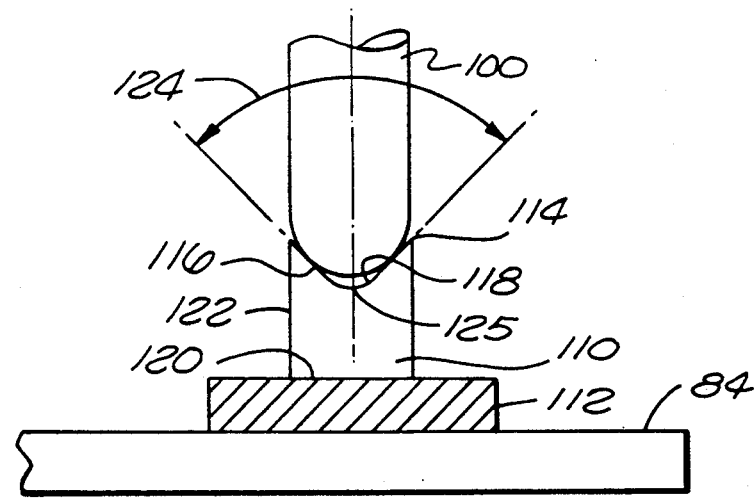
FIG. 9 is an enlarged, partial cross-sectional elevational view of the embodiment of FIG. 8 showing mounting of the Micrometer tip, anvil, and the surface of the thin beam.

FIG. 9 shows details of the track pad installation. The track pad 110 receives the spherical tip 116 of the Micrometer spindle 100 in a conical recess 118 on the upper side 114 of the track pad 110. The lower side 120 of the track pad 110 is machined flat and perpendicular to the cylindrical outside wall 122 of the track pad 110 and perpendicular to the axis of the conical recess 118. This flat side 120 bears against the top surface of the thin beam 84 (if the beam 84 is made of an acceptable material to rub against the track pad 110) or the top surface of the anvil plate 112 (if the material of the thin beam 84 is not suitable).

The conical recess 118 and the outside wall 122 of the track pad 110 are constructed as nearly concentric as possible, such as machining them both on a lathe without changing the set-up. The outside diameter of the track pad 110 is about the same as the diameter of the spherical tip 116 on the Micrometer spindle 100. The vertex angle 124 of the conical recess 118 in the track pad 110 is about 90 degrees. The opposing flat surface 120 of the track pad 110 is lapped against either the surface of the thin beam 84 or the anvil plate 112, depending upon the construction as discussed above. The lapping process assures a uniform distribution of contact bearing stresses over the circular area of the track pad 110 in contact with the anvil plate 112 or with the thin beam 84.

If the above design proportions are observed, the coefficient of friction, $\mu$, between track pad 110 and Micrometer spindle tip 116 and between the track pad 110 and the anvil 112 are equal, and the materials are selected to be compatible in sliding contact; then the action of the track pad 110 will be as follows:

[Note: materials which are incompatible in sliding contact (such as stainless steel on stainless steel) will tend to pit, spall, gauge and stick, resulting in uneven wear patterns and unpredictable friction forces.]

1) The only static forces on the track pad 110 will be the elastic reactions caused by the forced displacement of the beams 82 and 84 (under the influence of the Micrometer 86).

2) Turning the Micrometer thimble 104 to increase or decrease the spacing between the beams 82 and 84 will create torsional shear stresses in the contact areas a) between the anvil 112 and the track pad 110, a flat surface contact area, and b) between the spherical tip 116 of the Micrometer spindle 100, and the track pad 110, a circular line of contact between the spherical tip 116 and the conical recess 118.

3) Because of the geometry, the frictional torque available between the spindle 100 and the recess 118 will be greater than that available between the flat surfaces at 120.

4) These conditions will cause the following kinematics of the track pad 110: a) the track pad 110 will rotate with the Micrometer spindle 100 and b) the track pad 110 will swivel on the spherical surface of the Micrometer spindle 100 to accommodate slope changes of the thin cantilever beam 84 and/or the anvil 112.

If the value of the coefficient of friction, $\mu$, at the spindle 100 is different from its value at the anvil 112, then the designer may need to adjust either the diameter of the track pad 110 or the conical angle in the track pad 110 to assure that the above kinematic actions will be obtained. Using these design variables, a wide range of real conditions may be accommodated by the track pad 110.

As a result of friction, the net force transmitted to the thin beam 84 will be the sum of the force normal to the flat surface of the anvil and the friction force parallel to the flat surface of the anvil. The normal force may be determined from simple beam theory. The friction force will be further analyzed in the following paragraphs.

The friction force, $F_f$, is equal to the product of the normal force, P, and the coefficient of friction, $\mu$ $$F_f = P \times \mu.$$

Figure 10:
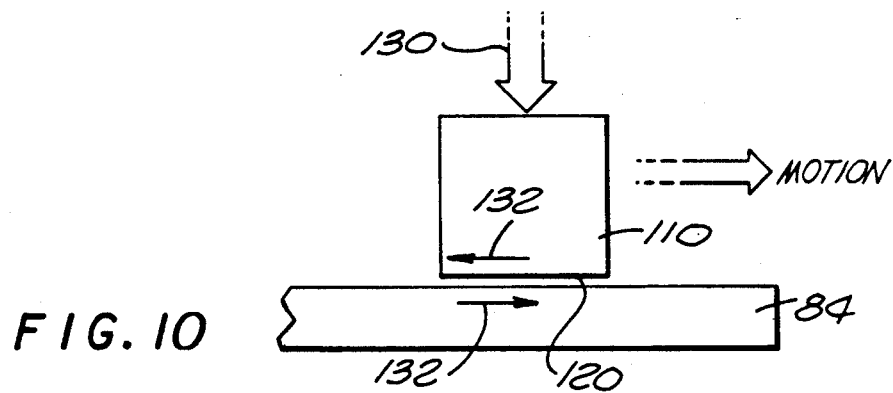
FIG. 10 is an elevational schematic of FIG. 9 showing the friction forces.

The normal force, P, is nominally the thrust imparted by the extension of the Micrometer spindle 100 and spreading the beams 82 and 84. The friction force is created by the existence of a friction shear stress between two surfaces that are moving relative to each other. Referring to FIG. 10 showing a simplified analysis using a block track pad 110 bearing directly against thin beam 84, the normal force 130 gives rise to a normal compressive bearing stress, $\sigma$, at the interface between two parts. The magnitude of this bearing stress is, $$\sigma = P/\pi r^2,$$

where r is half the diameter of the track pad 110, and P is the normal force 130.

If the track pad 110 moves in the direction of motion shown of motion in FIG. 10 with respect to the beam 84, then there will arise a frictional shear stress 132 in the plane of the bearing surface between the two parts. The local frictional shear stress, $\tau$, has three characteristics:

1) magnitude of $\tau$ (equal to $\sigma \times \mu$),
2) direction of $\tau$ (along the line of relative motion between the surfaces),
3) sense ($\pm$) of $\tau$ (to oppose the relative motion and bring it to rest).

It is important to note that the magnitude of the frictional shear stress 132 is independent of relative velocity.

Figure 11:
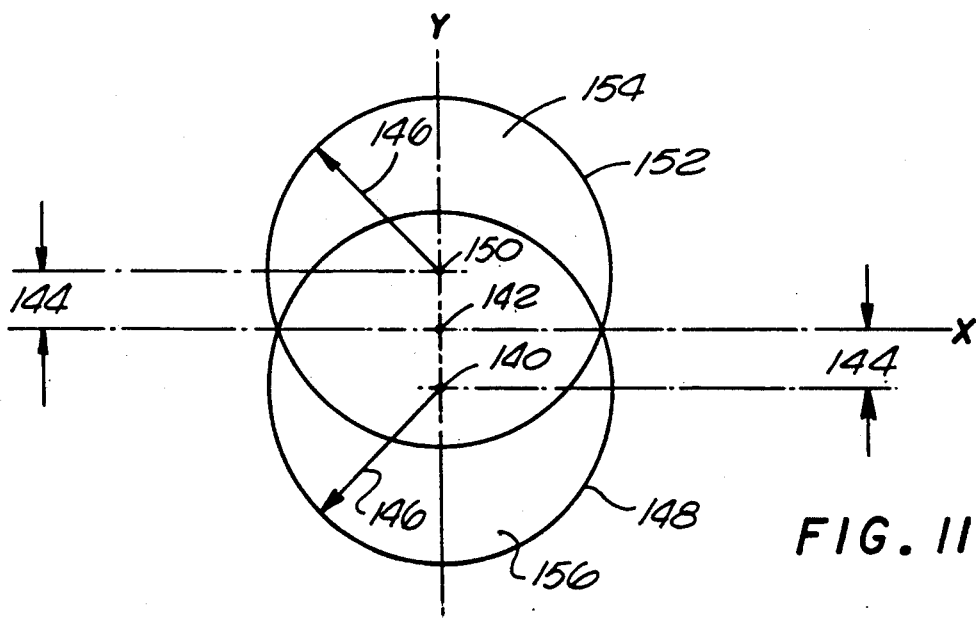
FIG. 11 is a schematic plan view showing the forces at the contact area between the pad and the anvil shown in FIG. 9.
Figure 6:
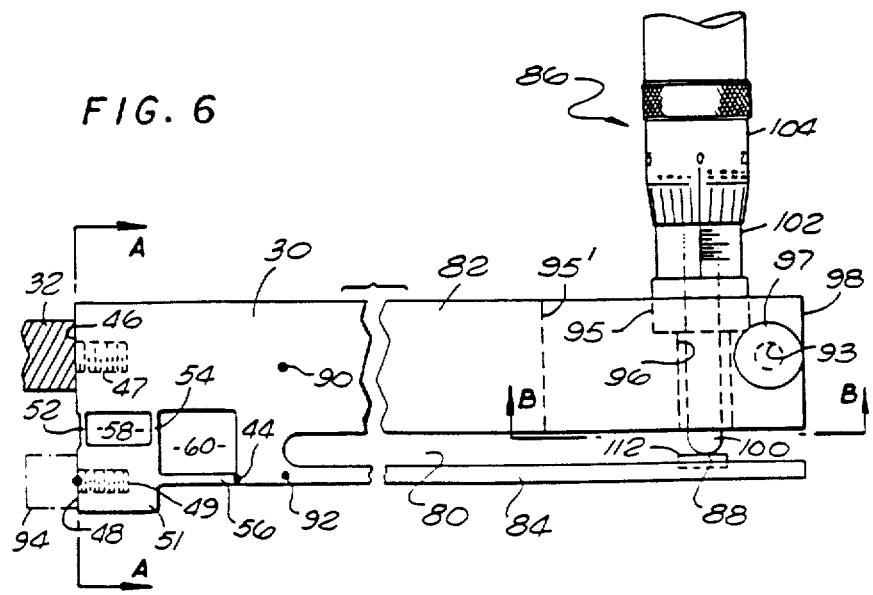
Figure 6A:
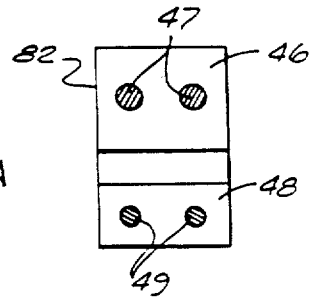
Figure 6B:
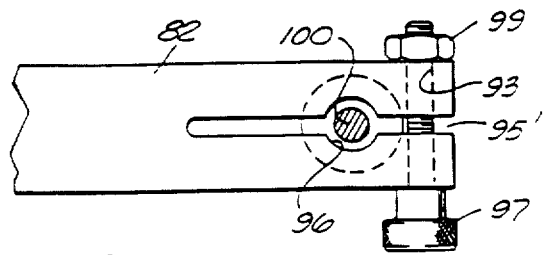

Referring to FIG. 11, which is a plan view of the contact area between the track pad 110 and the surface of the anvil 112, the center of the circular contact area 140 between the track pad 110 and the anvil 112 is shown, and the center of rotation 142 of the Micrometer spindle 100 is shown. The distance between the center of rotation 142 and the center of the contact area 140 is the eccentricity 144. The eccentricity 144 is the sum of all the centration errors which include, but may not be limited to: errors between the threads and the spindle diameter, errors between the spindle diameter and the spherical tip 116 radius, errors in the quality of the spherical surface, errors in the surface of the conical recess 118 in the track pad 110, and errors between the axis of the conical recess 118 and the axis of the track pad 110 outside diameter.

In FIG. 11, the Y axis is drawn through the two centers 140 and 142. The X axis is drawn through the center of rotation 142 and is at right angles to the Y axis. According to the three characteristics of the friction shear stress (magnitude, direction, sense), the following statements may be made with respect to the distribution of the frictional shear stress on the surface between the track pad 110 and the anvil 112:

1) The magnitude of the friction shear stress $\tau$, is uniform over the contact area such that, $$\tau = \mu P/\pi r^2.$$

where r is the contact area radius 146 equal to half of the diameter of the track pad 110.

2) The direction of the shear stress in the contact area is everywhere directed circumferentially with respect to the center of rotation 142.

3) If the track pad 110 is rotating clock-wise, then the friction shear stress on the track pad 110 will be counter-clock-wise, opposing the motion of the track pad 110. The friction shear stress on the surface of the anvil 112 will be equal in magnitude and opposite in sense to the friction shear stress on the track pad surface 120.

Using these observations about the distribution of the shear stress in the contact area of FIG. 11, it is possible to evaluate the unbalanced forces in the X-Y plane caused by the eccentricity 144 between the center of the contact area 140 and the center of rotation 142.

Two circles are shown in FIG. 11. The first (lower) circle is drawn with a radius 146 from the center of the contact area 140, creating perimeter 148. The center of the second circle 150 is located a distance equal to the eccentricity 144 from the center of rotation 142 on the Y axis, and away from the center of the contact area 140. The second circle has the same radius 146 as the first circle, creating perimeter 152.

The area common to both of the circles in FIG. 11 is symmetrically disposed with respect to the center of rotation 142. From the discussion of the distribution of the shear stresses it can be deduced that the horizontal component of the shear stresses below the X axis in the common area is exactly equal to and opposite to the horizontal component of the shear stresses above the X axis in the common area. Also, the vertical component of the shear stresses to the left of the Y axis in the common area is exactly equal to and opposite to the vertical component of the shear stresses to the right of the Y axis in the common area. Therefore the shear stresses in the common area cannot contribute to unbalanced forces in the X-Y plane.

The unbalanced forces in the X-Y plane must come from the shear stresses outside the common area in FIG. 11. There are two crescent shaped areas 154, 156 in FIG. 11 that are outside the common area. The upper crescent 154 is outside the contact area circumscribed by perimeter 148 and, therefore, cannot contain friction shear stresses. The lower crescent 156 is inside the contact area circumscribed by perimeter 148 and does contain friction shear stresses. It is the friction shear stresses in the lower crescent 156 that cause the unbalanced forces in the X-Y plane.

Considering the lower crescent 156 in FIG. 11, it may be observed that the vertical component of the shear stresses in the crescent 156 to the left of the Y axis are exactly equal to and opposite to the vertical component of the shear stresses in the crescent 156 to the right of the Y axis. The vertical component of the stresses in the crescent 156 cannot contribute to unbalanced forces in the X-Y plane. However, the horizontal component of the shear stresses in the crescent 156 have no counterbalancing components anywhere else in the system and they must be the source of the unbalanced forces in the X-Y plane.

To calculate the magnitude of the unbalanced horizontal forces in the crescent 156, one observes that the area of the crescent 156 must be less than $4\epsilon r$, where $\epsilon$ is the eccentricity 144. Since the contact area is $\pi r^2$, the total net unbalance friction force in the X direction, $F_x$, must be, $$F_x < \mu P \frac{4\epsilon}{\pi r}.$$

Furthermore, it can be shown that in the limit as $\epsilon$ approaches 0, $$F_x \text{ approaches } \mu P \frac{\epsilon}{r}.$$

So it is shown that the unbalance X-Y plane forces in the contact area of the track pad 110 may be materially reduced by the ratio of the rotational eccentricity 144 to the radius of the contact area 146.

In the contact area between a simple spherical tipped Micrometer and a flat surface, the eccentricity may be about the same size as the radius of the contact area, thereby generating large unbalanced friction forces in the plane of the contact when the spindle is rotated. By introducing a track pad between the tip of the Micrometer spindle and the flat surface, the contact area may be significantly enlarged causing a corresponding reduction of the unbalance friction forces. Reducing the unbalanced forces by factors as large as 100 to 1000 is practical.

A similar analysis for operation of track pads where the dry friction is replaced by hydrodynamic lubrication shows that the hydrodynamic lubrication will be even more effective in reducing the unbalanced friction forces.

From the above, it can be seen that the invention described is a stiff, stable and repeatable transducer system capable of reliably producing small motions beyond the capability of the prior art. The invention overcomes the intrinsic limitations of thread mechanisms (micrometers and compound screws), rigid levers, cranks and linkages, and piezoelectric devices of all kinds and offers a new regime of precision motion control. An elastic body of various shapes could be employed. Also, tension, compression and various other forces could be employed other than the bending shown.

Although specific embodiments have been illustrated and described, various modifications and changes may be made without departing from the scope of the invention. The appended claims are not limited to the embodiments described herein, but rather are intended to cover all variations and adaptions falling within the true scope and spirit of the present invention.

What I claim is:

1. A motion transducer, comprising:
    an elastic body;
    foundation means for supporting the elastic body;
    means supported by the elastic body for producing an input force or displacement;
    means on said elastic body for receiving said input force or displacement to create strain within said elastic body and for counterbalancing said strain to prevent force and displacement components from said strain from entering said foundation means from said elastic body; and
    means for directing and controlling said strain within said elastic body into at least one single, repeatable output deflection of said elastic body with respect to said foundation means.

2. A motion transducer, comprising:
an elastic body strain within the elastic body;
means supported by the elastic body for producing an input force or displacement;
means on said elastic body for receiving said input force or displacement to create strain within said elastic body;
means for fixing said elastic body to a foundation;
means for counterbalancing said input force or displacement to prevent force and displacement components from entering said foundation; and
means for directing and controlling said strain into at least one single, repeatable output deflection component of said elastic body with respect to said foundation.

3. A motion transducer as defined in claim 2, further comprising:
means for transmitting to an external body the output deflection component of said elastic body.

4. A motion transducer, comprising:
an elastic body
means supported by said elastic body for applying an input force or displacement to said elastic body to create a strain therein;
means for fixing said elastic body to a foundation;
means for receiving and counterbalancing said input force or displacement to prevent force and displacement components from entering said foundation; and
means for directing and controlling said strain into at least one single, repeatable output deflection of said elastic body resulting from said input force or displacement.

5. A motion transducer as defined in claim 4, wherein said means for directing and controlling further comprises:
at least one flexure formed by at least one cutout in said elastic body.

6. A motion transducer as defined in claim 4, wherein said means for applying a force or displacement further comprises:
a Micrometer for causing relative displacement between portions of said elastic body.

7. A motion transducer as defined in claim 4, wherein said elastic body further comprises:
a thick elastic beam fixed to said elastic body;
a thin elastic beam fixed to said elastic body in parallel with said thick elastic beam; and
wherein said means for directing and controlling further comprise three flexures formed by two cutouts in said elastic body.

8. A motion transducer as defined in claim 4, wherein said means for directing and controlling further comprises:
at least one flexure fixed to said elastic body.

9. A motion transducer as defined in claim 8, further comprising:
a thick elastic beam fixed to said elastic body;
a thin elastic beam fixed to said elastic body in parallel with said thick elastic beam; and
wherein said means for directing and controlling further comprise three flexures fixed to said elastic beams and said elastic body.

10. A motion transducer, adapted to receive input forces or displacements, comprising:
an entirely elastic body comprising means for insuring that anticipated input forces or displacements will generate strain in the elastic body without perceptible plastic strain within the elastic body, said elastic body having two cutouts, said cutouts forming three flexures for directing and controlling input translational and rotational deflection components within said elastic body into at least one single, repeatable output deflection component;
a thick elastic beam and a thin elastic beam parallel to each other and fixed to said elastic body;
a bore formed in said beam substantially perpendicular to said thick beam, said bore being adapted to receive a Micrometer inserted into the bore, said beams and bore comprising means for counterbalancing which are connected to the elastic body to counterbalance said input force or displacement to prevent external force and displacement components from entering said elastic body;
a means for fixing said Micrometer in said bore;
an anvil positioned on said thin beam adapted to be contacted by the Micrometer spindle;
means for mounting said elastic body to a foundation; and
means for transmitting said output displacements.

11. A motion transducer, comprising:
an elastic body;
means supported by said elastic body for producing strain within said elastic body;
means for supporting said elastic body;
counterbalancing means adapted to prevent said strain in said elastic body from causing reaction loads in the supporting means; and
means for providing an output displacement of a portion of said elastic body with respect to the means for supporting said elastic body.

* * * * *

UNITED STATES PATENT AND TRADEMARK OFFICE
CERTIFICATE OF CORRECTION

PATENT NO.   : 5,187,876
DATED        : February 23, 1993
INVENTOR(S)  : Alson E. Hatheway It is certified that error appears in the above-identified patent and that said Letters Patent is hereby corrected as shown below:

Figure 6, identify the bore by the number --95--, as shown on the attached page.

Figure 6B, change "95" to --95'--.

Column 4, line 32, delete "forces".

Column 4, line 33, delete "at the".

Column 6, line 29, delete "translational" and insert --translations-- therefor.

Column 6, line 30, delete "rotationals" and insert --rotations-- therefor.

Column 8, line 13, delete the first instance of "93" and insert --95-- therefor.

Column 8, line 15, delete "95" and insert --95'-- therefor.

Column 8, line 16, delete "clearance 96" and insert --bore 95-- therefor.

Column 14, line 14, delete "unbalance" and insert --unbalanced-- therefor.

Column 15, line 4, delete "strain within the elastic body".

UNITED STATES PATENT AND TRADEMARK OFFICE
CERTIFICATE OF CORRECTION

PATENT NO. : 5,187,876
DATED     : February 23, 1993
INVENTOR(S) : Alson E. Hatheway It is certified that error appears in the above-identified patent and that said Letters Patent is hereby corrected as shown below:

Column 15, line 25, delete "body" and insert --body;-- therefor.

Signed and Sealed this

Thirty-first Day of May, 1994

Attest:

BRUCE LEHMAN

Attesting Officer

Commissioner of Patents and Trademarks